(12) United States Patent
Chen

(10) Patent No.: US 11,391,314 B2
(45) Date of Patent: Jul. 19, 2022

(54) SCREW WITH CUTTING SLOTS

(71) Applicant: ESSENCE METHOD REFINE CO., LTD., Tainan (TW)

(72) Inventor: Ling-Fang Chen, Tainan (TW)

(73) Assignee: ESSENCE METHOD REFINE CO., LTD., Tainan (TW)

( * ) Notice: Subject to any disclaimer, the term of this patent is extended or adjusted under 35 U.S.C. 154(b) by 384 days.

(21) Appl. No.: 16/718,516

(22) Filed: Dec. 18, 2019

(65) Prior Publication Data

US 2021/0190119 A1    Jun. 24, 2021

(51) Int. Cl.
*F16B 25/00* (2006.01)

(52) U.S. Cl.
CPC ...... *F16B 25/0063* (2013.01); *F16B 25/0052* (2013.01); *F16B 25/0073* (2013.01); *F16B 25/0084* (2013.01); *F16B 25/00* (2013.01); *F16B 25/0047* (2013.01)

(58) Field of Classification Search
CPC ............. F16B 25/0047; F16B 25/0052; F16B 25/0063; F16B 25/0073; F16B 25/0084; F16B 25/103; F16B 25/00
USPC ............. 411/386, 387.1–387.6, 387.7, 387.8
See application file for complete search history.

(56) References Cited

U.S. PATENT DOCUMENTS

| | | | |
|---|---|---|---|
| 5,759,003 A | 6/1998 | Greenway et al. | |
| 6,106,208 A * | 8/2000 | Lin | F16B 25/103 411/386 |
| 8,511,958 B2 * | 8/2013 | Chang | F16B 25/103 411/387.7 |
| 8,647,038 B2 * | 2/2014 | Gong | F16B 25/103 411/386 |
| 8,926,249 B2 * | 1/2015 | Lin | F16B 25/0084 411/386 |
| 8,944,734 B2 * | 2/2015 | Su | F16B 25/0063 411/386 |
| 10,480,561 B2 * | 11/2019 | Chao | F16B 25/0015 |
| 2006/0285940 A1 | 12/2006 | Walther | |
| 2007/0269288 A1 | 11/2007 | Palm | |
| 2007/0286701 A1 * | 12/2007 | Hsu | F16B 25/10 411/387.1 |
| 2009/0035091 A1 * | 2/2009 | Geist | F16B 33/02 470/11 |

(Continued)

FOREIGN PATENT DOCUMENTS

TW    201231829 A1    8/2012

*Primary Examiner* — Roberta S Delisle
(74) *Attorney, Agent, or Firm* — Karin L. Williams; Mayer & Williams PC

(57) ABSTRACT

A screw includes a shank with an outer periphery, a head connected to the shank, and thread convolutions spiraling around the shank in a right-hand direction. The outer periphery defines opposite first and second peripheral envelope surfaces. A cutting slot unit is formed on the shank and arranged on the first peripheral envelope surface. The cutting slot unit includes a first cutting slot with two first edges and a second cutting slot with two second edges. The first edge extends in an extension direction opposite to the right-hand direction. One first edge of the first cutting slot is parallel to one second edge of the second cutting slot. The opposite extension of the cutting slot unit assists the screw in screwing quickly, attains quick removal of chips, and increases the fastening effect by pressing chips downwards.

10 Claims, 15 Drawing Sheets

(56) References Cited

U.S. PATENT DOCUMENTS

| | | | |
|---|---|---|---|
| 2010/0158634 A1* | 6/2010 | Walther | F16B 25/0015 |
| | | | 411/399 |
| 2010/0172718 A1 | 7/2010 | Gong et al. | |
| 2012/0063865 A1* | 3/2012 | Huang | F16B 25/0047 |
| | | | 411/393 |
| 2013/0039720 A1* | 2/2013 | Shih | F16B 25/0047 |
| | | | 411/387.4 |
| 2013/0309042 A1* | 11/2013 | Chao | F16B 25/0084 |
| | | | 411/387.1 |
| 2015/0050101 A1* | 2/2015 | Shih | F16B 25/0057 |
| | | | 411/411 |
| 2017/0016468 A1* | 1/2017 | Lin | F16B 25/0015 |
| 2018/0231046 A1* | 8/2018 | Chao | F16B 25/0015 |
| 2019/0093691 A1* | 3/2019 | Ruhmann | F16B 25/0015 |

\* cited by examiner

SCREW WITH CUTTING SLOTS

BACKGROUND OF THE INVENTION

1. Field of the Invention

This invention relates to a screw and relates particularly to a screw with cutting slots.

2. Description of the Related Art

Referring to FIG. 1, a conventional screw 1 includes a shank 11, a head 12 connected to the shank 11, and right-hand threads 13 spiraling around the shank 11. The shank 11 tapers to form a tip 14 opposite to the head 12 and has a groove 15 formed thereon. In operation, a tool (not shown) is used to rotate the head 12 and screw the threads 13 into a workpiece (not shown). The groove 15 serves to cut the workpiece and accommodate chips caused by cutting the workpiece, thereby completing a screwing operation. However, the shank 11 only has one groove 15, and the groove 15 extends in a clockwise direction corresponding to the spiraling direction of the right-hand threads 13, with the result that the cutting effect is limited and fibers of the workpiece are not efficiently severed. The single groove 15 also cannot help quick removal of the chips and cannot have enough space for accommodating more residual chips. Thus, the accumulation of the chips blocks the groove 15 easily and causes larger resistance against the screwing operation. The excessive accumulation of the chips also adds undue pressure to the workpiece, which causes the cracking of the workpiece and slows the screwing operation down. Even if the screw 1 is drilled into the workpiece, the groove 15 extending in the clockwise direction cannot press residual chips downwards and thus cannot increase the fastening effect. Furthermore, the screw 1 only uses the tip 14 to touch the workpiece, so the area of bearing force is small. In this case, the tip 14 easily deviates from its correct position suitable for the screwing operation while being subjected to improper force. Users need to take time and effort to keep the tip 14 standing upright for screwing the screw 1 into the workpiece completely. Thus, the screw 1 still needs improvements.

SUMMARY OF THE INVENTION

The object of this invention is to provide a screw with cutting slots which executes a quick screwing operation, prevents the workpiece from cracking, and attains a stable fastening effect and increasing pull-out resistance.

A screw of this invention includes a shank having an outer periphery, a head connected to the shank, and a threaded portion spiraling around the shank. An end of the shank tapers to form a tip opposite to the head and defines an axis passing through the tip. The shank includes a lower region within which the tip is located and a main region defined between the lower region and the head. The outer periphery of the shank further defines a first peripheral envelope surface and a second peripheral envelope surface opposite to the first peripheral envelope surface. The threaded portion includes a plurality of thread convolutions spiraling in a right-hand direction and defines a pitch between every two adjacent thread convolutions. On the shank is formed a cutting slot unit including a first cutting slot and a second cutting slot. The two cutting slots are spaced apart and arranged on the first peripheral envelope surface. The first cutting slot has a first top pointing the head, a first bottom pointing the tip, and at least one first wall extending between the first top and the first bottom. Two first edges are formed at a place where the first wall meets the outer periphery of the shank and the thread convolutions and extend towards the head in an extension direction opposite to the right-hand direction of the thread convolutions. The second cutting slot has a second top pointing the head, a second bottom pointing the tip, and at least one second wall extending between the second top and the second bottom. Two second edges are formed at a place where the second wall meets the outer periphery and the thread convolutions. One first edge is parallel to one second edges so that the two cutting slots are arranged by an opposite extension in comparison with the right-hand thread convolutions. Accordingly, the cutting slot unit enhances an initial cutting operation and helps quick removal of the chips, reduce screwing resistance, and prevent the cracking of a workpiece caused by excessive accumulation of the chips. The opposite extension of both cutting slots also presses residual chips so that the chips crowd in the cutting slots, thereby increasing the fastening effect and attaining pull-out resistance.

Preferably, the cutting slot unit is situated within the lower region of the shank. It is possible that the first cutting slot is spaced from or connected to the tip. When the first cutting slot is spaced from the tip, it is preferable that the threaded portion connects the tip and spirals toward the head, and at least one complete thread convolution of the threaded portion spirals between the first bottom and the tip. The first bottom and the first top of the first cutting slot are respectively situated on a right side and a left side of the axis to allow the extension direction of the first edge to go across the axis from right to left.

Preferably, a first distance defined between the two first edges of the first cutting slot is set from 0.5 to 1 times the pitch of the threaded portion, and a second distance defined between the two second edges of the second cutting slot is set from 0.5 to 1 times the pitch, thereby providing suitable slot widths for both cutting slots.

Preferably, the spiraling threaded portion extends axially by an overall length. The first wall of the first cutting slot extends by a first axial length which is ⅓ times the overall length, and the second wall of second cutting slot extends by a second axial length which is ⅓ times said overall length, thereby providing suitable slot lengths for both cutting slots.

Preferably, between the first bottom of the first cutting slot and the second bottom of the second cutting slot is defined a third space set from 0.5 to 2 times the pitch of the threaded portion to attain easy removal of the cut chips.

Preferably, at least two thread convolutions of the threaded portion are formed with a plurality of notches. Between the notches are disposed a plurality of first thread portions and a plurality of second thread portions alternating with the first thread portions. Each first thread portion has a first crest, and each second thread portion has a second crest. A first reference line defined by connecting the first crests is different from a second reference line defined by connecting the second crests, thereby increasing cutting points and attaining a firm engagement between the screw and the workpiece.

Preferably, the cutting slot unit can further include at least one auxiliary cutting slot spaced from the second cutting slot to promote the cutting effect. The auxiliary cutting slot has an auxiliary top pointing the head, an auxiliary bottom pointing the tip, and at least one auxiliary wall extending between the auxiliary top and the auxiliary bottom. Two auxiliary edges are formed at a place where the auxiliary wall meets the outer periphery and the thread convolutions.

One auxiliary edge is parallel to one second edge of the second cutting slot, so all cutting slots of the cutting slot unit are arranged by an opposite extension in comparison with the right-hand thread convolutions. It is also noted that between the second bottom of the second cutting slot and the auxiliary bottom of the auxiliary cutting slot is defined a fourth space set from 0.5 to 2 times the pitch of the threaded portion to facilitate removal of the chips.

Preferably, it is possible to provide two cutting slot units situated within the lower region of the shank. One cutting slot unit is arranged on the first peripheral envelope surface of the outer periphery of the shank, and the other cutting slot unit is arranged on the second peripheral envelope surface thereof.

Preferably, it is possible to provide two or more cutting slot units respectively situated within the lower region and the main region of the shank. Any cutting slot unit situated within the lower region is at least arranged on the first peripheral envelope surface. In other words, one of the cutting slot units within the lower region must be arranged on the first peripheral envelope surface.

Preferably, the first cutting slot and the second cutting slot are spaced from each other to define a second space set from ⅙ to ⅘ times the pitch of the threaded portion, thereby providing a suitable lateral distance between both cutting slots for cutting, supporting, and also facilitating removal of the chips.

DETAILED DESCRIPTION OF THE PREFERRED EMBODIMENTS

Figure 1:
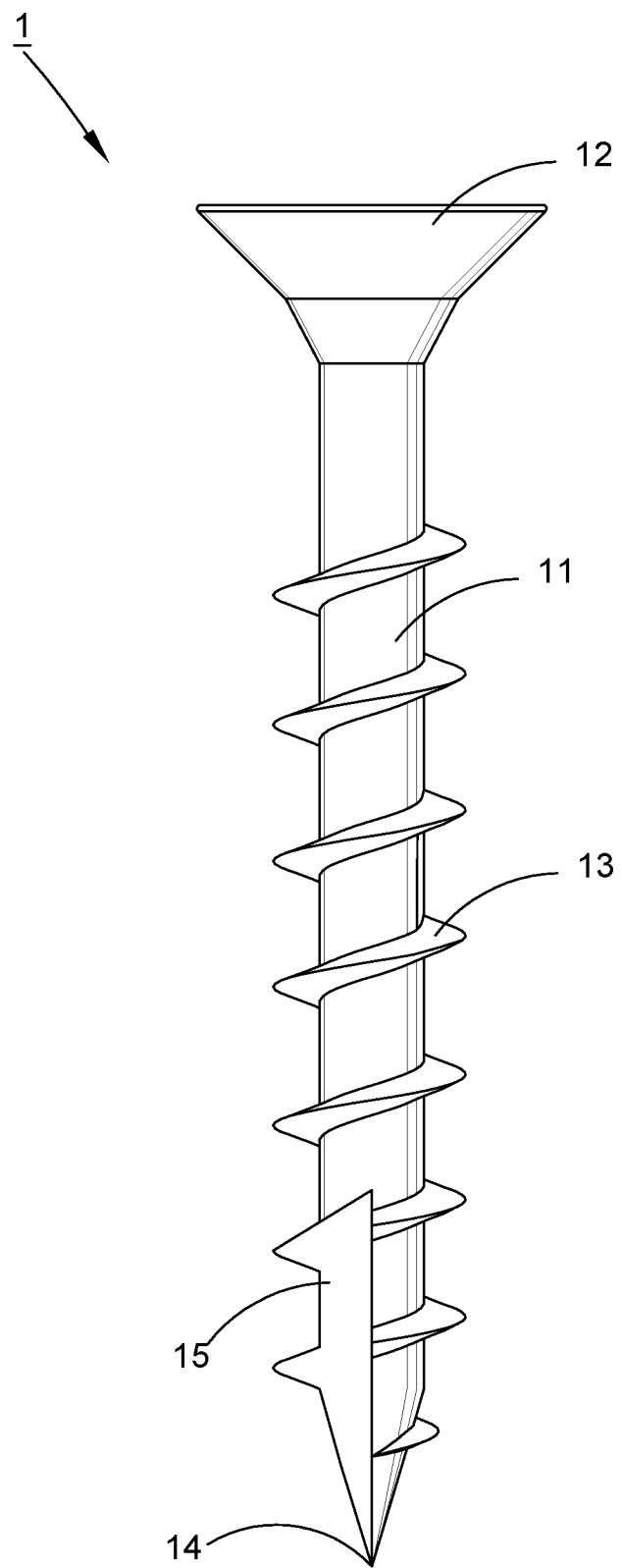
FIG. 1 is a schematic view showing a conventional screw.
Figure 2:
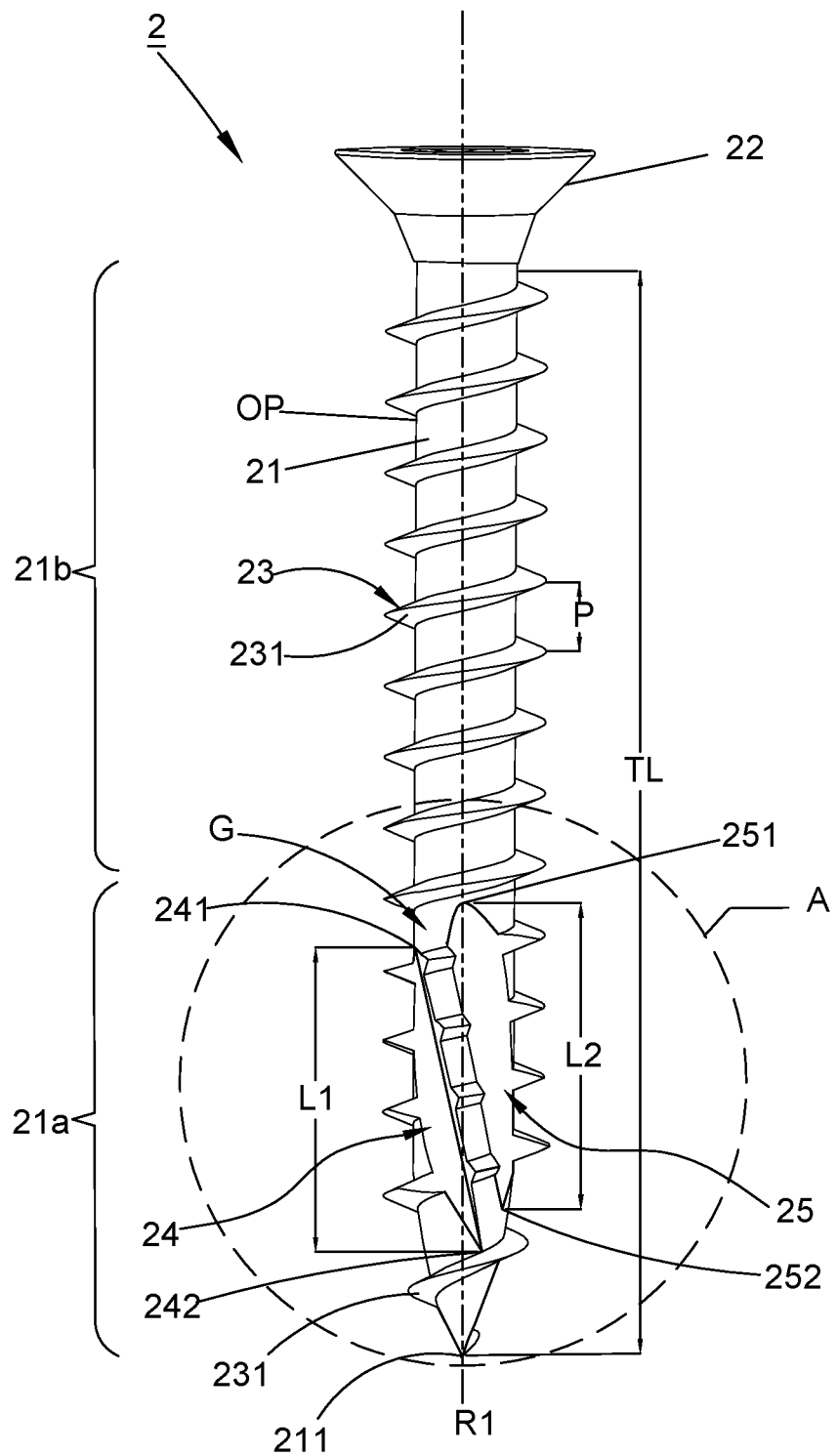
FIG. 2 is a schematic view showing a first preferred embodiment of this invention.
Figure 5:
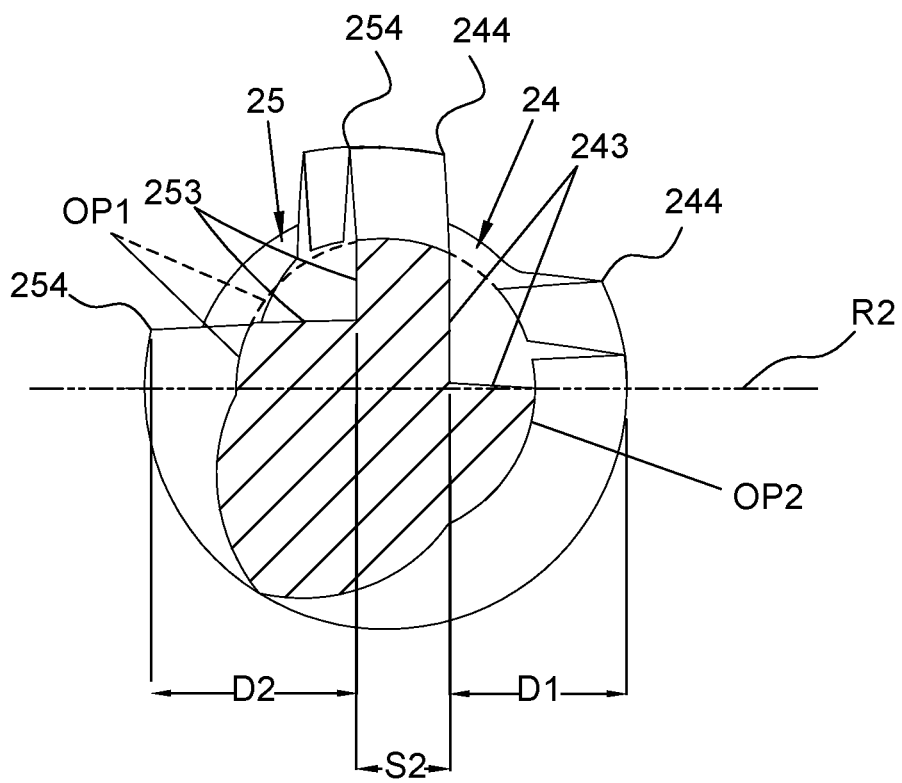
FIG. 5 is a top plan view of FIG. 4.
Figure 6:
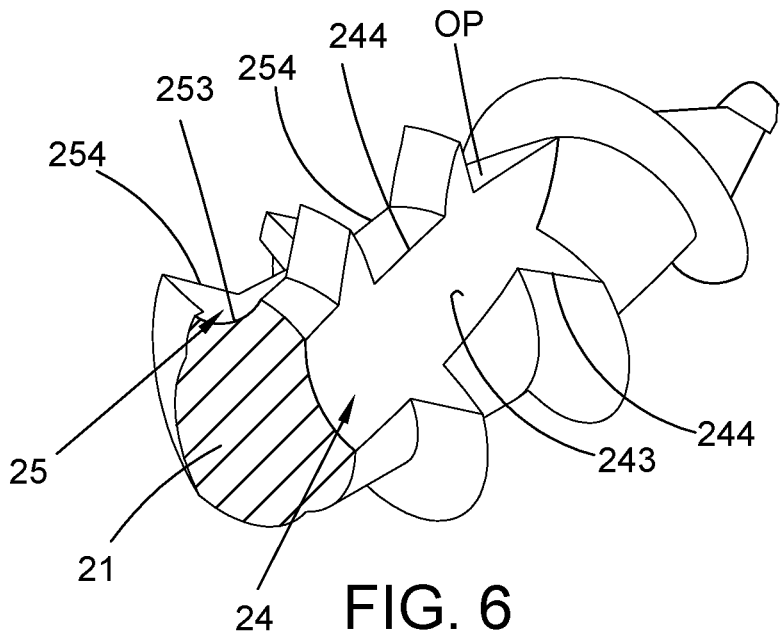
FIG. 6 is a partial perspective view showing a second variation of the first preferred embodiment.
Figure 7:
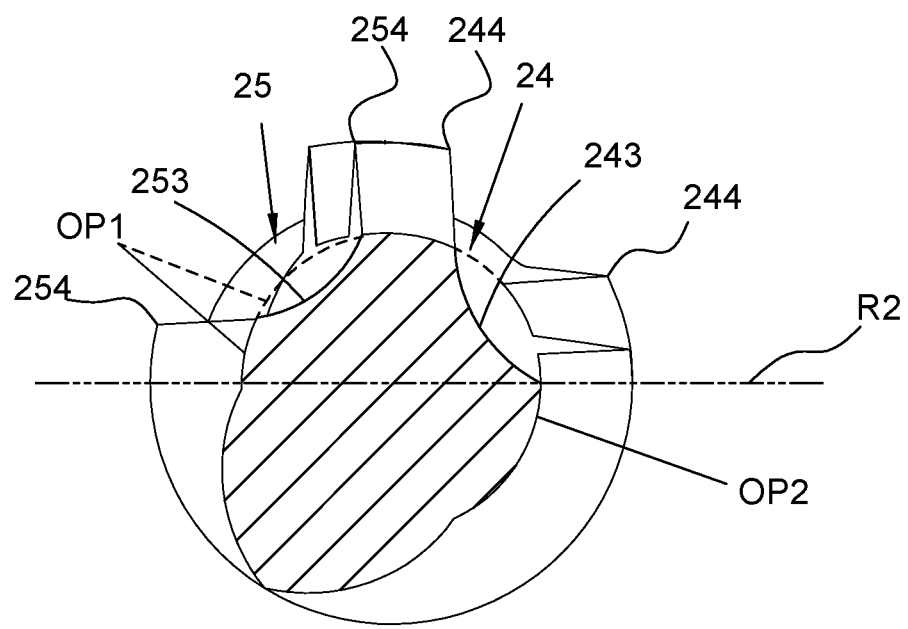
FIG. 7 is a top plan view of FIG. 6.
Figure 8:
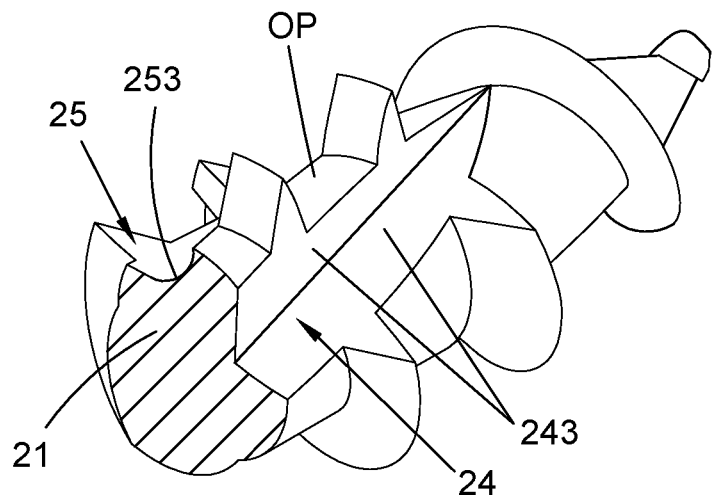
FIG. 8 is a partial perspective view showing a third variation of the first preferred embodiment.
Figure 9:
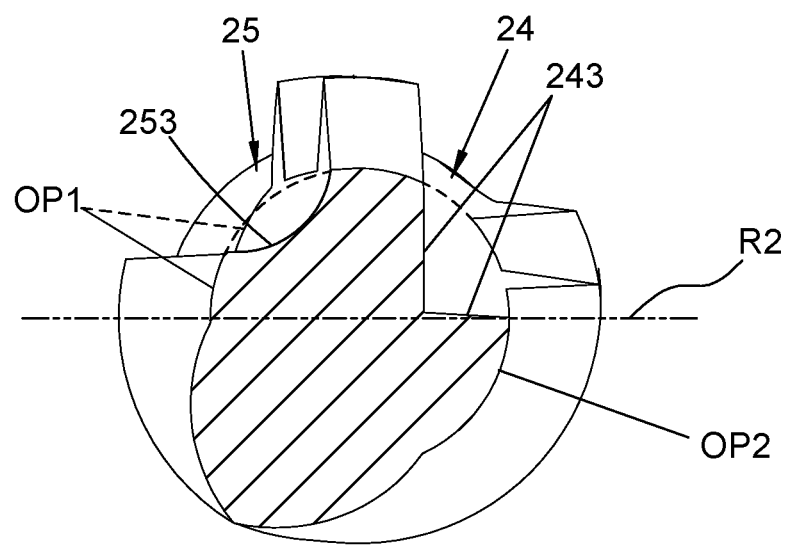
FIG. 9 is a top plan view of FIG. 8.

Referring to FIG. 2, a first preferred embodiment of a screw 2 with cutting slots includes a shank 21, a head 22 connected to one end of the shank 21, and a threaded portion 23 spirally disposed around the shank 21. The threaded portion 23 has a plurality of thread convolutions 231 spiraling in a right-hand direction as right-hand threads, as shown. Every two adjacent thread convolutions 231 are spaced apart to define a pitch P therebetween. The shank 21, preferably circular in cross section, has an outer periphery OP. The shank 21 tapers to terminate at a tip 211 opposite to the head 22 and defines an axis R1, namely a central axis, passing through the tip 211, a lower region 21a extending by a certain length, and a main region 21b defined between the lower region 21a and the head 22. The tip 211 is located within the lower region 21a. The outer periphery OP further defines opposite peripheral portions, namely a first peripheral envelope surface OP1 and a second peripheral envelope surface OP2 as shown in FIG. 5. Specifically, when the shank 21 forms a baseline R2 while viewed in cross section, the baseline R2 divides the outer periphery OP into two peripheral envelope surfaces OP1, OP2 facing different directions. If the baseline R2 passes through a center of the shank 21, the peripheral envelope surfaces OP1, OP2 are symmetric.

Figure 4:
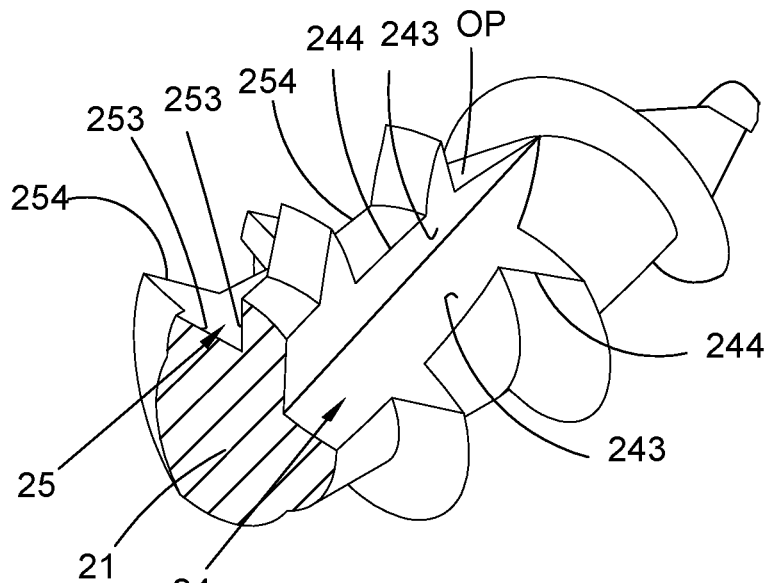
FIG. 4 is a partial perspective view showing a first variation of the first preferred embodiment.
Figure 10:
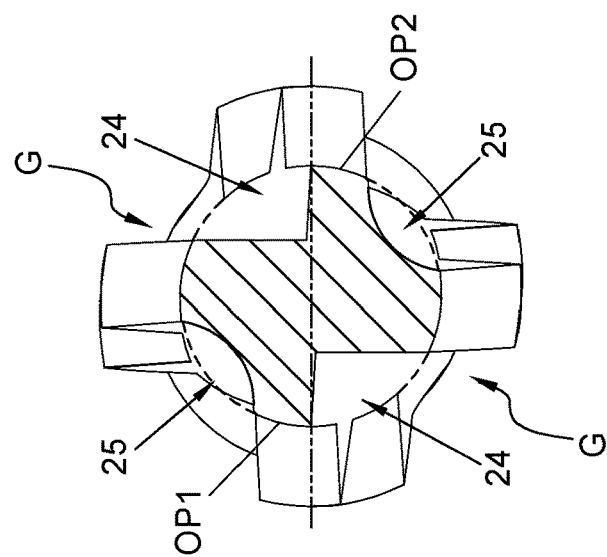
FIG. 10 is a top plan view showing one variation of FIG. 5.
Figure 11:
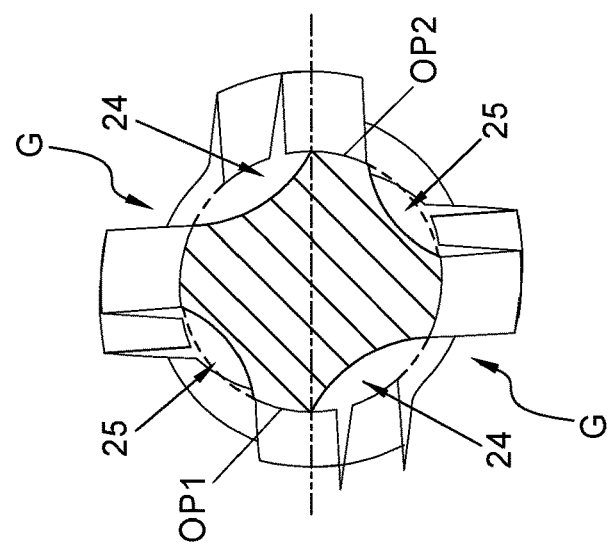
FIG. 11 is a top plan view showing one variation of FIG. 7.
Figure 12:
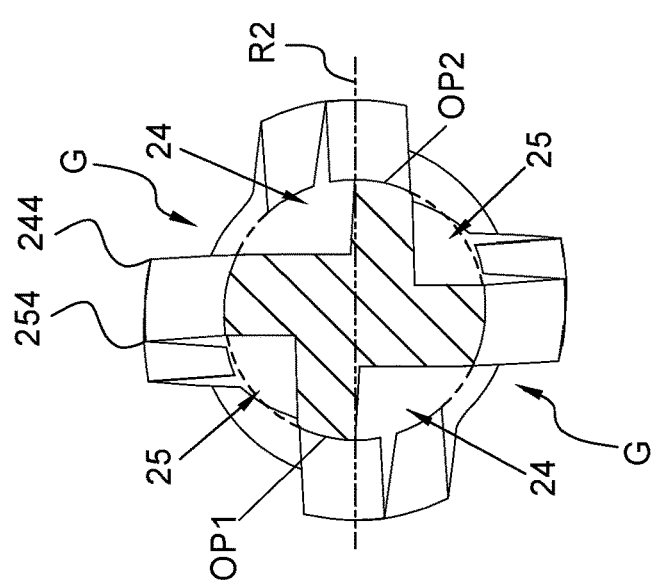
FIG. 12 is a top plan view showing one variation of FIG. 9.
Figure 13:
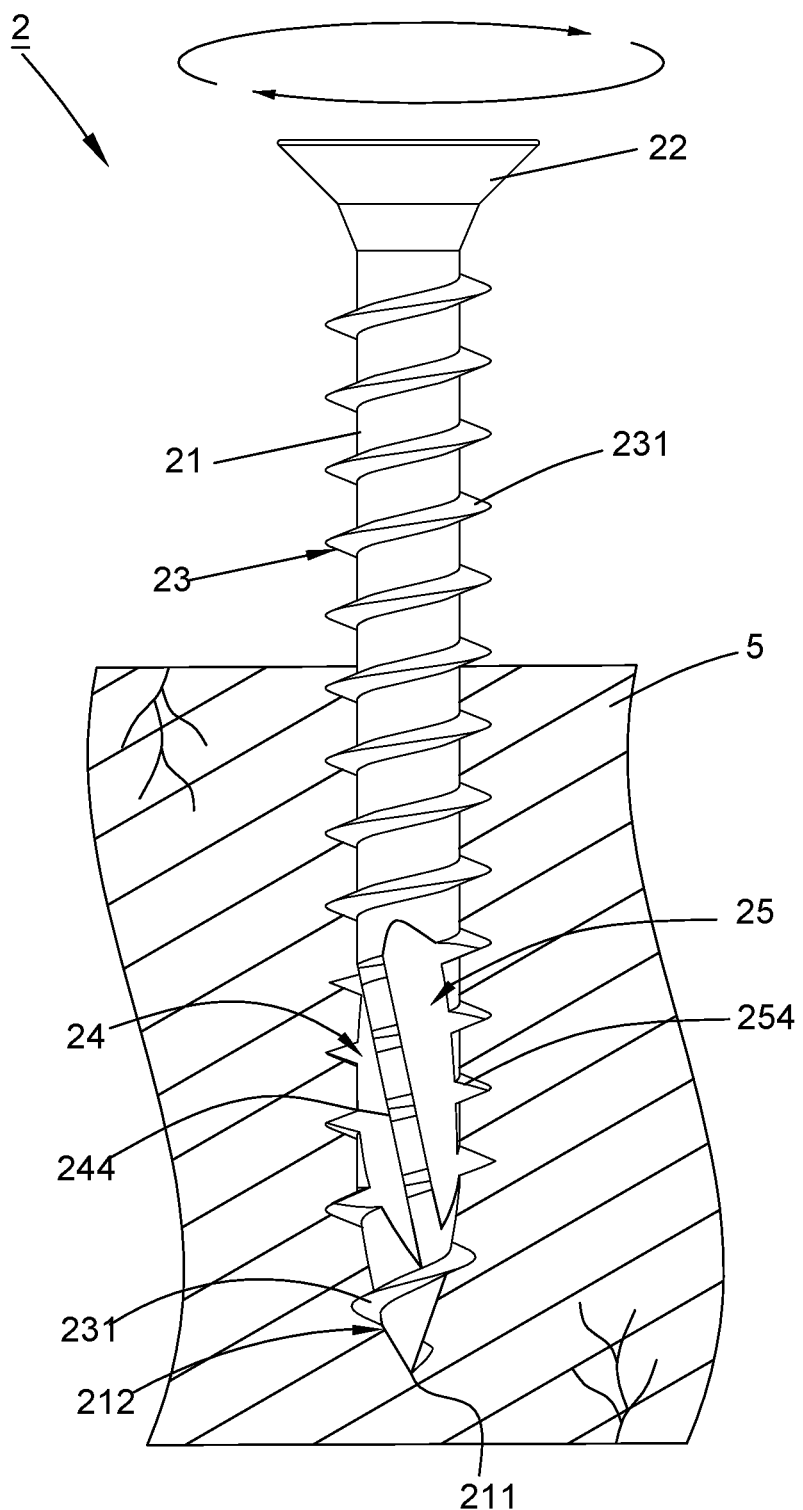
FIG. 13 is a schematic view showing the screwing operation of the first preferred embodiment.

At least one cutting slot unit G is formed on the shank 21 and includes a first cutting slot 24 and a second cutting slot 25 spaced from the first cutting slot 24. In the first preferred embodiment, one cutting slot unit G is adopted, and preferably the first cutting slot 24 is located on the left lower side of the second cutting slot 25, and both cutting slots 24, 25 are arranged on the same peripheral portion, namely on the first peripheral envelope surface OP1 as for example shown in FIGS. 4 to 9 to facilitate the process of forming the slots. Alternatively, two cutting slot units G are shown in FIGS. 10 to 12 where one of the cutting slot units G is arranged on the first peripheral envelope surface OP1, and the other slot units G is arranged on the second peripheral envelope surface OP2. Only the configuration shown in FIG. 4 is adopted to describe the operation of the screw 2.

Figure 3:
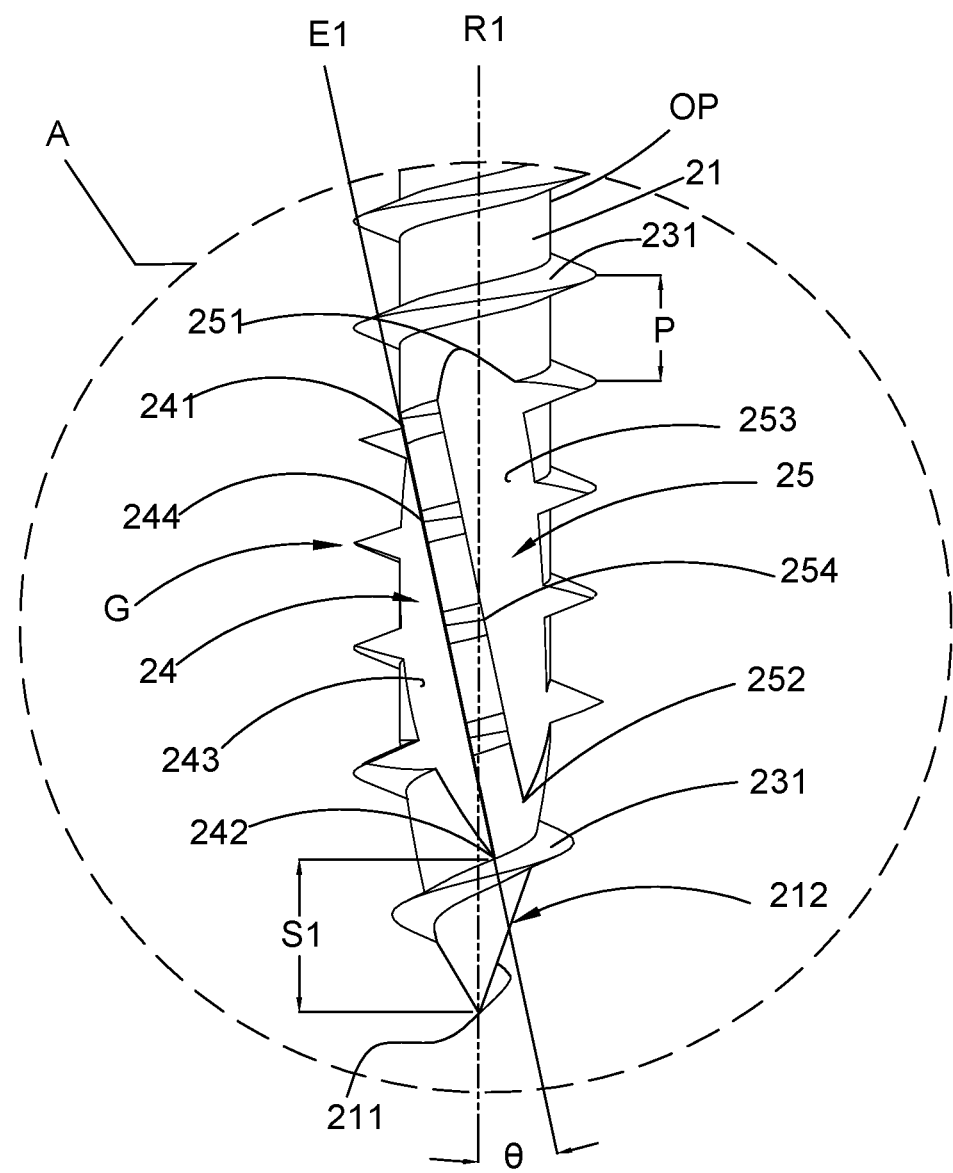
FIG. 3 is an enlarged view of the encircled portion A of FIG. 2.

Referring to FIGS. 2 and 3, the first cutting slot 24 includes a first top 241 pointing the head 22, a first bottom 242 pointing the tip 211, and at least one first wall 243 extending between the first top 241 and the first bottom 242. The second cutting slot 25 includes a second top 251 pointing the head 22, a second bottom 252 pointing the tip 211, and at least one second wall 253 extending between the second top 251 and the second bottom 252. The first cutting slot 24 and the second cutting slot 25 have the same shape or different shapes by adopting one or more first walls 243 and second walls 253 according to demand. For example, in terms of the same shape, two or more first walls 243 and two or more second walls 253 may be formed, so the cutting slots 24, 25 can be shaped into an L shape because of the first walls 243 connected at right angles and the second walls 253 connected at right angles, shaped into a V shape because of the first walls 243 which are not connected at right angles and the second walls 253 which are not connected at right angles, or shaped into a shape with three or more sides. In FIGS. 4 and 5, two first walls 243 and two second walls 253 are respectively shown to have the same shape. It is also possible to use a single first wall 243 and a single second wall 253 shown in FIGS. 6 and 7, and preferably both walls 243, 253 are curved in shape. In terms of different shapes, the number of the first walls 243 and the number of the second walls 253 can be different, shown in FIGS. 8 and 9. Alternatively, the number of the first walls 243 and the number of the second walls 253 correspond under different angles. For example, one cutting slot has an L shape, and the other cutting slot has a V shape. The first cutting slot 24 and the second cutting slot 25 with the same shape or different shapes can help cut the workpiece by their opposite extension, attain quick removal of chips, accommodate remaining chips, and press chips to increase the fastening effect.

Two first edges 244 are formed at a place where the first wall 243 is connected to the outer periphery OP and the thread convolutions 231. The first edge 244 extends towards the head 22 in an extension direction E1 opposite to the right-hand direction of the thread convolutions 231. Two second edges 254 are formed at a place where the second wall 253 is connected to the outer periphery OP and the thread convolutions 231. One of the two first edges 244, as for example the edge on the right side shown in FIG. 3, is parallel to one of the two second edges 254, as for example the edge on the left side shown in FIG. 3. Thus, the extension direction of the second cutting slot 25 is opposite to the right-hand direction of the thread convolutions 231.

When the cutting slot unit G is situated within the lower region 21a, a first space S1, an axial distance parallel to the axis R1, can be defined from the first bottom 24 of the first cutting slot 24 to the tip 211 to form a leading area 212. Preferably, the first space S1 is set from 1 to 1.5 times the pitch P. The first bottom 242 is situated on a right side of the axis R1, and the first top 241 is situated on a left side thereof, so the extension direction E1 of the first edge 244 goes across the axis R1 from right to left to present an opposite extension shown in FIG. 3. Meanwhile, the first edge 244 can be inclined to the axis R1 by an angle θ ranging from 5 to 60 degrees and preferably at 10 degrees, 15 degrees, 45 degrees, or 60 degrees. Thus, the first cutting slot 24 is an opposite slot different from the right-hand thread convolutions 231. The first cutting slot 24 and the second cutting slot 25 are spaced apart to define a second space S2 which is preferably set from ⅙ to ⅘ times the pitch P, shown in FIG. 5, to allow the first edge 244 and the second edge 254 to have improved resistance to torsion torque.

The threaded portion 23 spirals around the shank 21 and extends axially towards the head 22 by an overall length TL. The first wall 243 extends by a first axial length L1, a length parallel to the axis R1 between the first top 241 and the first bottom 242, and serves as a slot length of the first cutting slot 24. The second wall 253 extends by a second axial length L2, a length parallel to the axis R1 between the second top 251 to the second bottom 252, and serves as a slot length of the second cutting slot 25. Both axial lengths L1, L2 are adjustable according to demand. Preferably, the axial lengths L1, L2 each are ⅓ (one-third) times the overall length TL. Referring to FIG. 5, a first distance D1 defined between the two first edges 244 is set from 0.5 to 1 times the pitch P to serve as a slot width of the first cutting slot 24. A second distance D2 defined between the two second edges 254 is set from 0.5 to 1 times the pitch P to serve as a slot width of the second cutting slot 25. Thus, both cutting slots 24, 25 are provided with proper slot lengths and slot widths for facilitating the cutting operation and the removal and accommodation of chips caused by the cutting operation.

The threaded portion 23 spiraling between the first bottom 242 and the tip 211 is arranged by at least one complete helix and is connected to the tip 211. In short, at least one complete thread convolution 231 is disposed within the leading area 212 to cut at the beginning of the screwing operation, help the smooth movement of chips, and allow the screw 2 to engage with the workpiece 5 in position.

The screwing operation of the screw 2 is described with the aid of FIGS. 2 to 4 and FIG. 13. The screw 2 is screwed into a hard workpiece 5, such as an iron board of below 0.8 mm, a hard wood board, and a composite wood board. The tip 211 is put against a surface of the workpiece 5, and then the head 22 is rotated clockwise as arrowed in FIG. 13 to drill the shank 21 into the workpiece 5. Because the threaded portion 23 meets the tip 211 and cooperates with the leading area 212, the complete thread convolution 231 within the leading area 212 causes downward pulling force to cut the workpiece 5 and gradually drill the shank 21 into the workpiece 5 upright. This prevents the tip 211 from deviating from its right position suitable for the beginning of the screwing operation, so the screw 2 engages with the workpiece 5 in position quickly. Then, the first edge 244 of one first wall 243, the first wall on the right-hand side as for example shown in FIG. 13, and the second edge 254 of one second wall 253, the second wall on the right-hand side as for example shown in FIG. 13, keep cutting the workpiece 5. Meanwhile, because the cutting slots 24, 25 are inclined and spaced apart to form the second space S2, some thread convolutions 231 are distributed within the second space S2 and inclined to help the cutting operation and movement of chips. Thus, the shank 21 keeps screwing along the inclination of the thread convolutions 231 to decrease the screwing resistance and screw quickly. The second space S2 also supports both cutting slots 24, 25 to resist undue force added to the cutting slots 24, 25 during the cutting operation and prevent the first edges 244 and the second edges 254 from suffering excessive force and being broken. Thus, the strength of the screw 2 resisting torsion torque is increased.

When the chips caused by the cutting operation enter the cutting slots 24, 25 along the thread convolutions 231, the chips further travel along the other first wall 243 and the other second wall 253 and move to the head 22 for quick removal. The slot lengths and slot widths of both cutting slots 24, 25 are also sufficient to accommodate residual chips. The residual chips are then pressed downwards by the opposite extension of the cutting slots 24, 25 and thence stay in the cutting slots 24, 25 for attaining a firm engagement between the screw 2 and the workpiece 5 and enhancing the pull-out resistance whereby the screw 2 is not easily pulled out of the workpiece 5. By the opposite extension, both cutting slots 24, 25 resist the screwing resistance to cut and screw into the workpiece 5 gradually, remove chips quickly for preventing the cracking of the workpiece 5 caused by excessive accumulation of the chips, and increase the fastening effect by pressing the chips downwards for attaining an anti-loosening effect.

Figure 14:
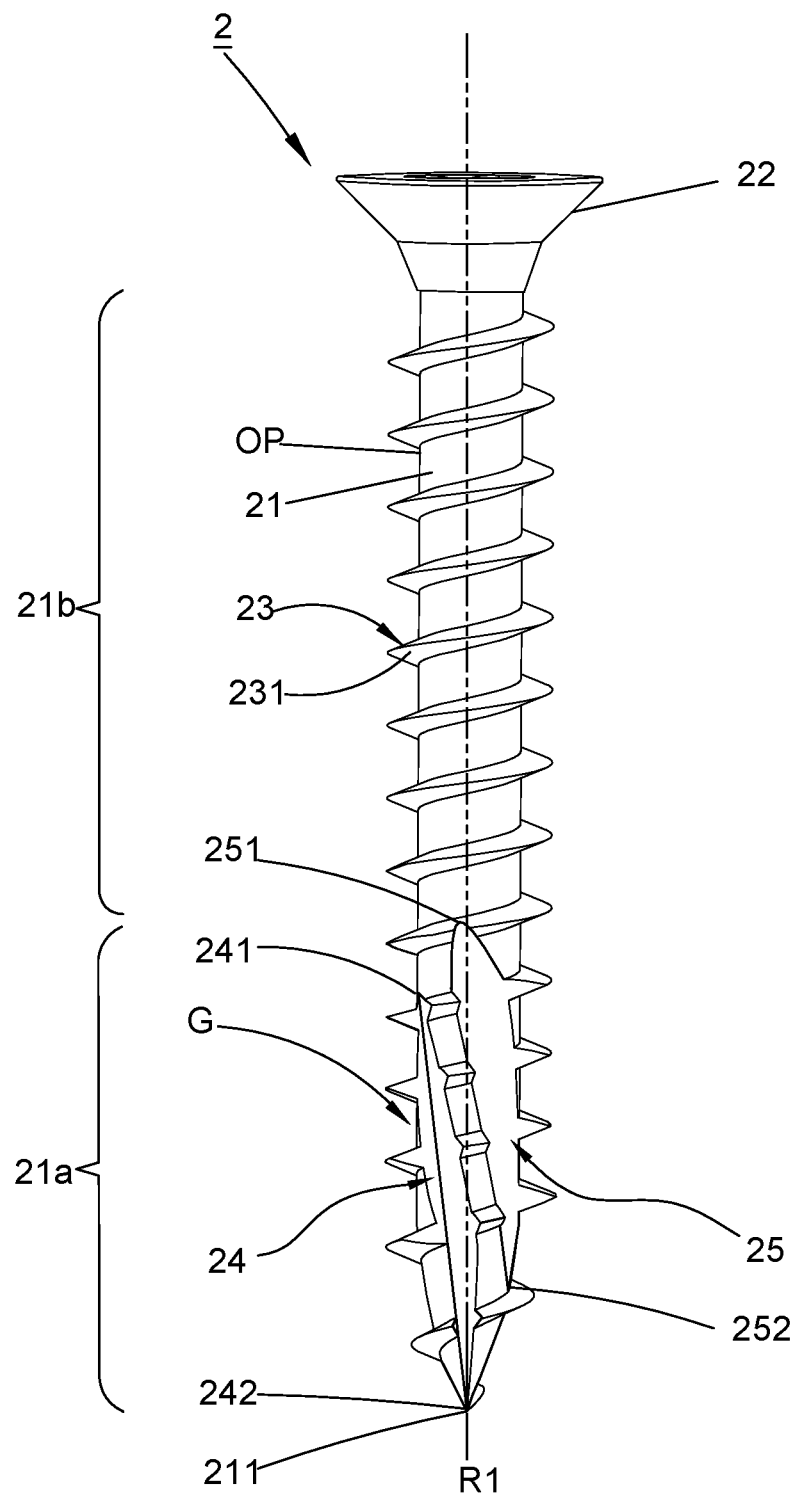
FIG. 14 is a schematic view showing a second preferred embodiment of this invention.

FIG. 14 shows a second preferred embodiment of the screw 2 including the same elements as those described in the first preferred embodiment. The second preferred embodiment is characterised in that when the cutting slot unit G is situated within the lower region 21a, the first bottom 242 of the first cutting slot 24 is connected to the tip 211 to help cut by the opposite extension of the slots 24, 25 as previously indicated, attain quick removal of chips, accommodate remaining chips, and press chips to increase the fastening effect.

Figure 15:
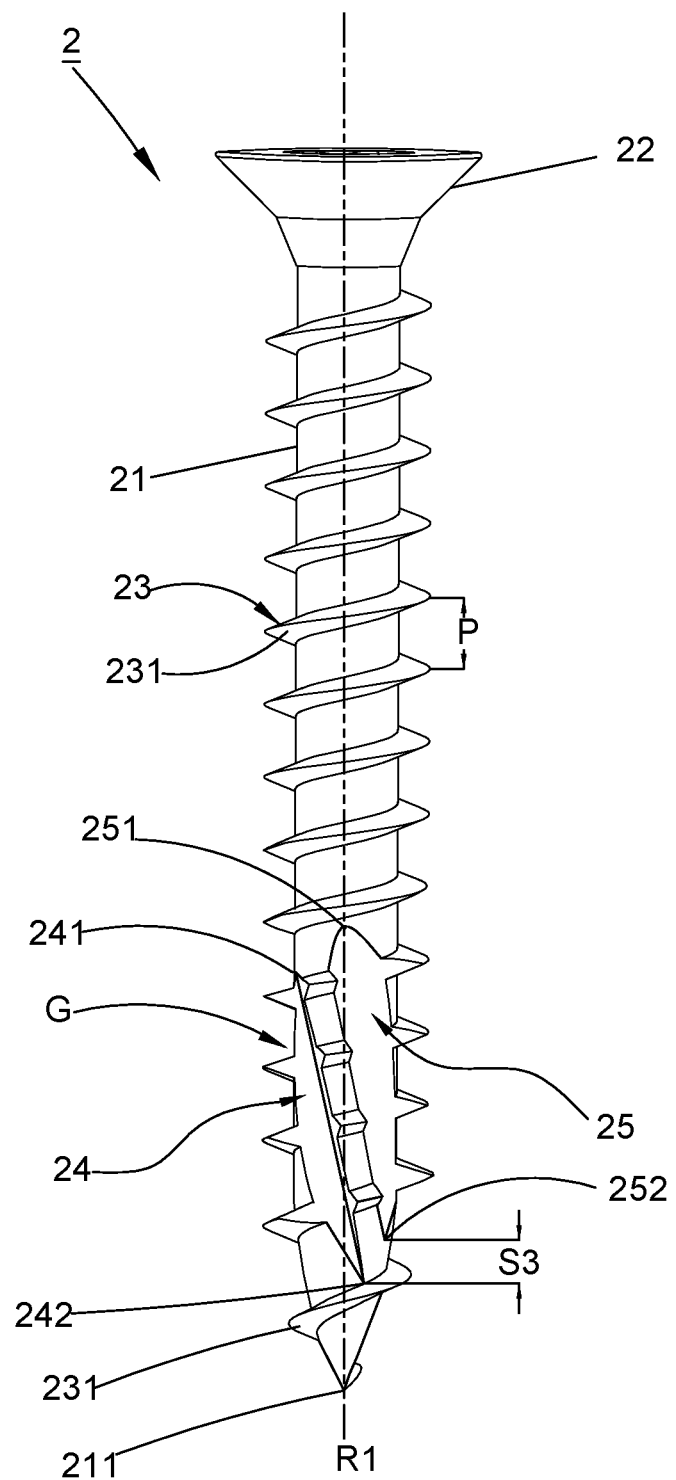
FIG. 15 is a schematic view showing a third preferred embodiment of this invention.

FIG. 15 shows a third preferred embodiment of the screw 2 including the same elements as those described in the first preferred embodiment. Particularly, a third space S3, an axial distance parallel to the axis R1, is defined between the first bottom 242 and the second bottom 252 and is set from 0.5 to 2 times the pitch P. Accordingly, a suitable axial distance formed between the locations of both cutting slots 24, 25 allows the chips to move to the head 22 easily along the threaded portion 23 and both cutting slots 24, 25, thereby facilitating quick removal of chips.

Figure 16:
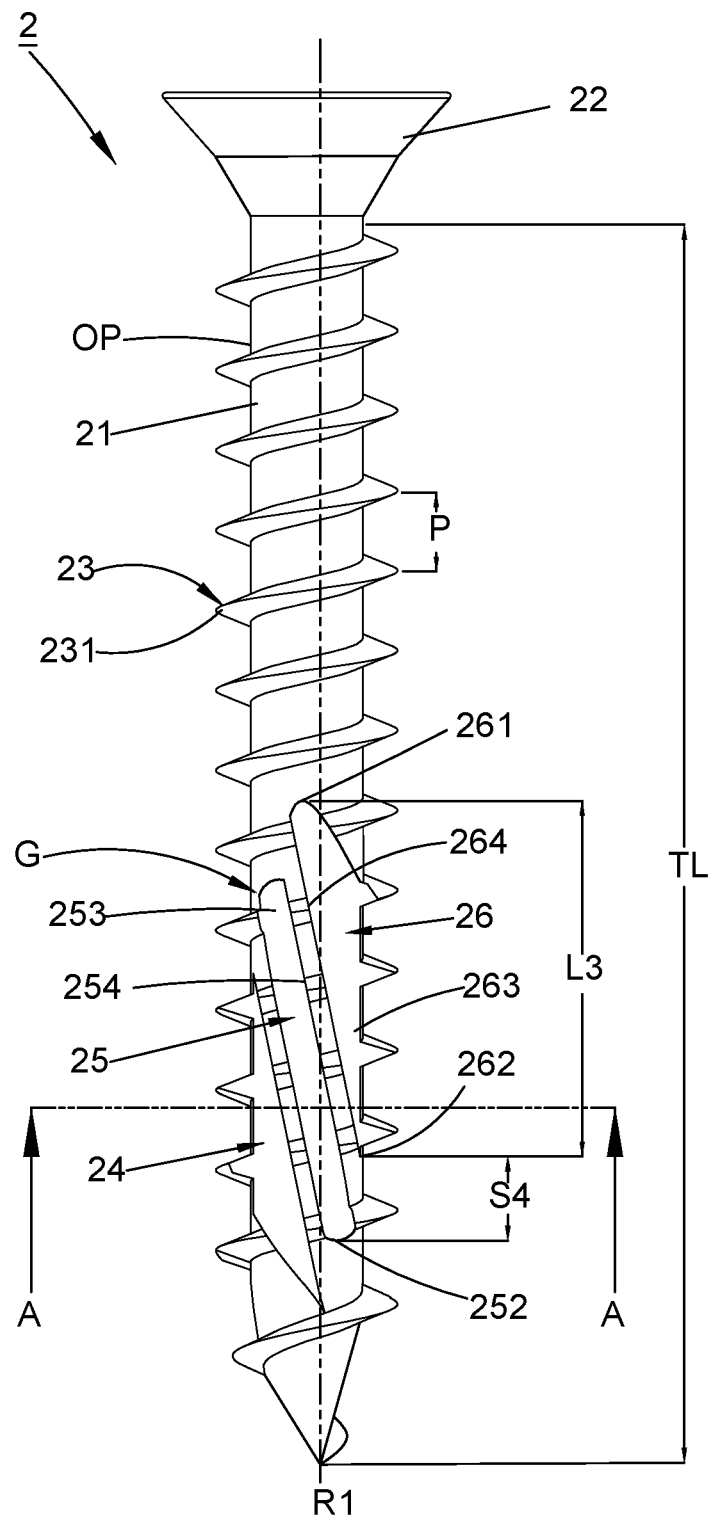
FIG. 16 is a schematic view showing a fourth preferred embodiment of this invention.

FIG. 16 shows a fourth preferred embodiment of the screw 2 including the same elements as those described in the first preferred embodiment. Particularly, the cutting slot unit G further includes at least one auxiliary cutting slot 26 spaced from the second cutting slot 25. In this preferred embodiment, one auxiliary cutting slot 26 is adopted as an example. The auxiliary cutting slot 26 has an auxiliary top 261 pointing the head 22, an auxiliary bottom 262 pointing the tip 211, and at least one auxiliary wall 263 extending between the auxiliary top 261 and the auxiliary bottom 262. Two auxiliary edges 264 are formed at a place where the auxiliary wall 263 meets the outer periphery OP and the thread convolutions 231. One auxiliary edge 264 is parallel to one second edge 254 of the second cutting slot 25, so the extension direction of the auxiliary cutting slot 26 is opposite to the right-hand thread convolutions 231. Accordingly, the three cutting slots 24, 25, 26 combine as a cutting slot unit G to execute an optimum cutting action by their opposite extension, attain quick removal of chips, accommodate remaining chips, and press chips to increase the fastening effect.

Figure 17:
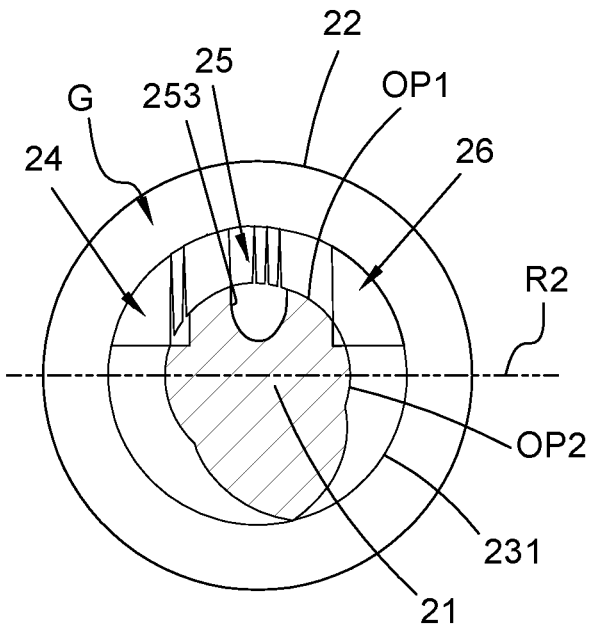
FIG. 17 is a cross-sectional view viewed from the A-A section of FIG. 16.
Figure 18:
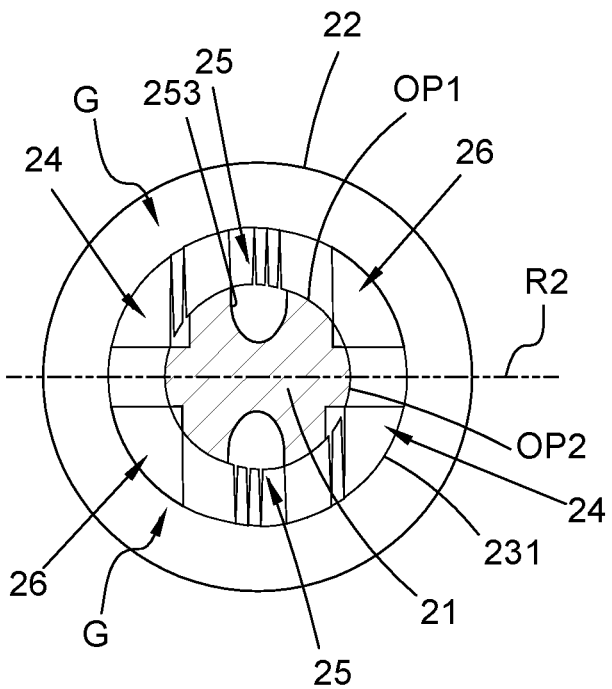
FIG. 18 is a cross-sectional view showing one variation of FIG. 17.

In the fourth preferred embodiment, the auxiliary wall 263 extends by a third axial length L3, a length parallel to the axis R1 between the auxiliary top 261 and the auxiliary bottom 262, and serves as a slot length of the third cutting slot 26. The length L3 is preferably ⅓ (one-third) times the overall length TL. A fourth space S4, an axial distance parallel to the axis R1, is defined between the auxiliary bottom 262 and the second bottom 252 and is set from 0.5 to 2 times the pitch P, thereby facilitating the cutting operation and accommodation of chips and attaining easy removal of the chips. It is adopted in this preferred embodiment that one cutting slot unit G is shown in FIG. 17 where three cutting slots 24, 25, 26 are all arranged on the same peripheral portion, namely on the first peripheral envelope surface OP1. Alternatively, two cutting slot units G may be shown in FIG. 18 where three cutting slots 24, 25, 26 of one cutting slot unit G are arranged on the first peripheral envelope surface OP1, and three cutting slots 24, 25, 26 of the other cutting slot unit G are arranged on the second peripheral envelope surface OP2. This configuration attains a good cutting operation, quick removal of chips, and accommodation of more chips, and also allows multiple cutting slots to be formed at once by a cutting process, thereby increasing the processing efficiency. In this case, the second cutting slot 25 can be curved in shape to provide an increasing thickness between the lowest inner surface of the second cutting slot 25 and the lowest inner surfaces of the other two cutting slots 24, 26 whereby the strength of the configuration with multiple cutting slots is reinforced.

Figure 19:
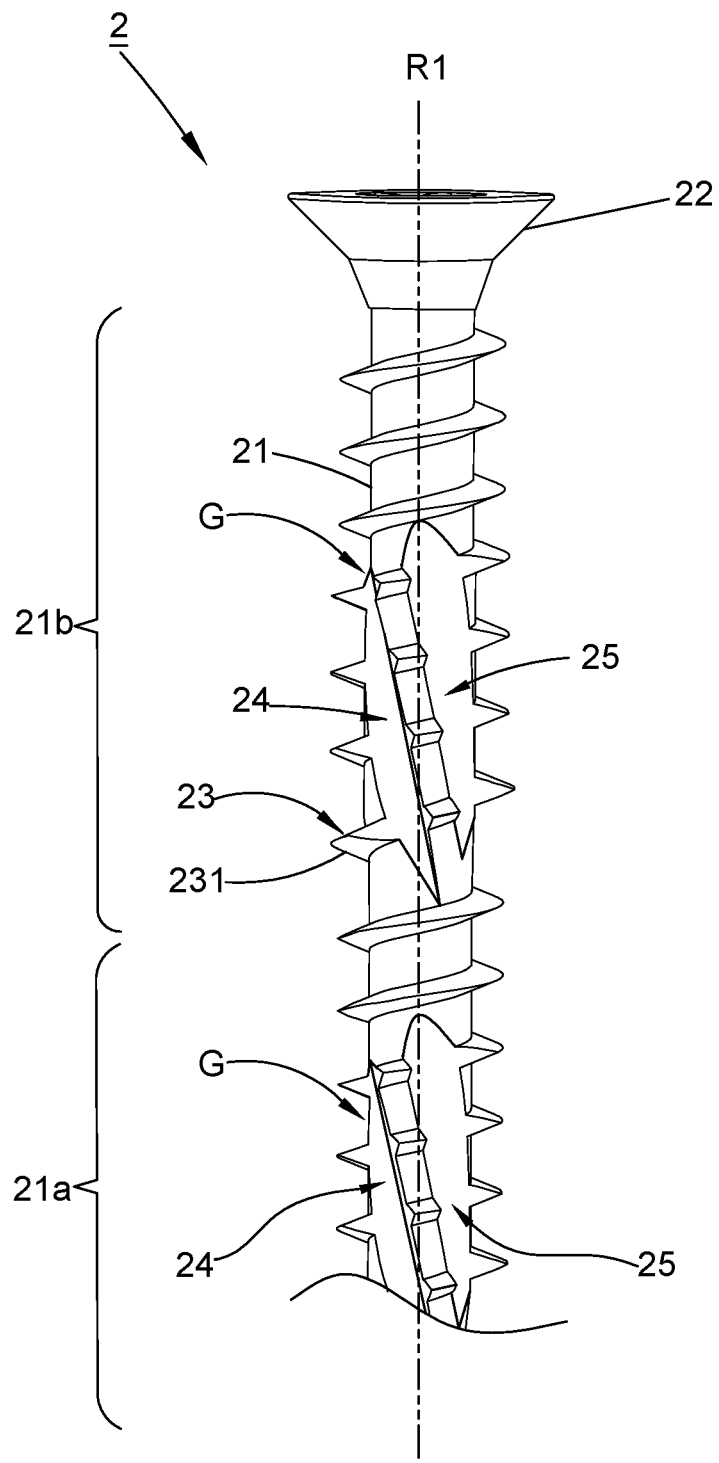
FIG. 19 is a schematic view showing a fifth preferred embodiment of this invention.

FIG. 19 shows a fifth preferred embodiment of the screw 2 including the same elements as those described in the first or the second preferred embodiment. Particularly, two or more cutting slot units G are adopted and spaced from each other. For example, the cutting slot units G are respectively situated within the lower region 21a and the main region 21b, and any cutting slot unit G situated within the lower region 21a is at least arranged on the first peripheral envelope surface OP1, as for example shown in FIGS. 4 to 9. In other words, one of the cutting slot units G or the cutting slot unit G within the lower region 21a must be arranged on the first peripheral envelope surface OP1. Further, the cutting slot unit G within the lower region 21a and the cutting slot unit G within the main region 21b can be arranged on the same peripheral envelope surface or different peripheral envelope surfaces. It is also possible that two cutting slot units G are formed within the main region 21b and are respectively arranged on the peripheral envelope surfaces OP1, OP2. In the figure, one cutting slot unit G within the lower region 21a and one cutting slot unit G within the main region 21b are spaced apart and arranged on the same peripheral envelope surface. Accordingly, the cutting slot units G within different regions 21a, 21b execute a good cutting behavior by their opposite extension, attain quick removal of chips, accommodate remaining chips, and press chips to increase the fastening effect.

Figure 20:
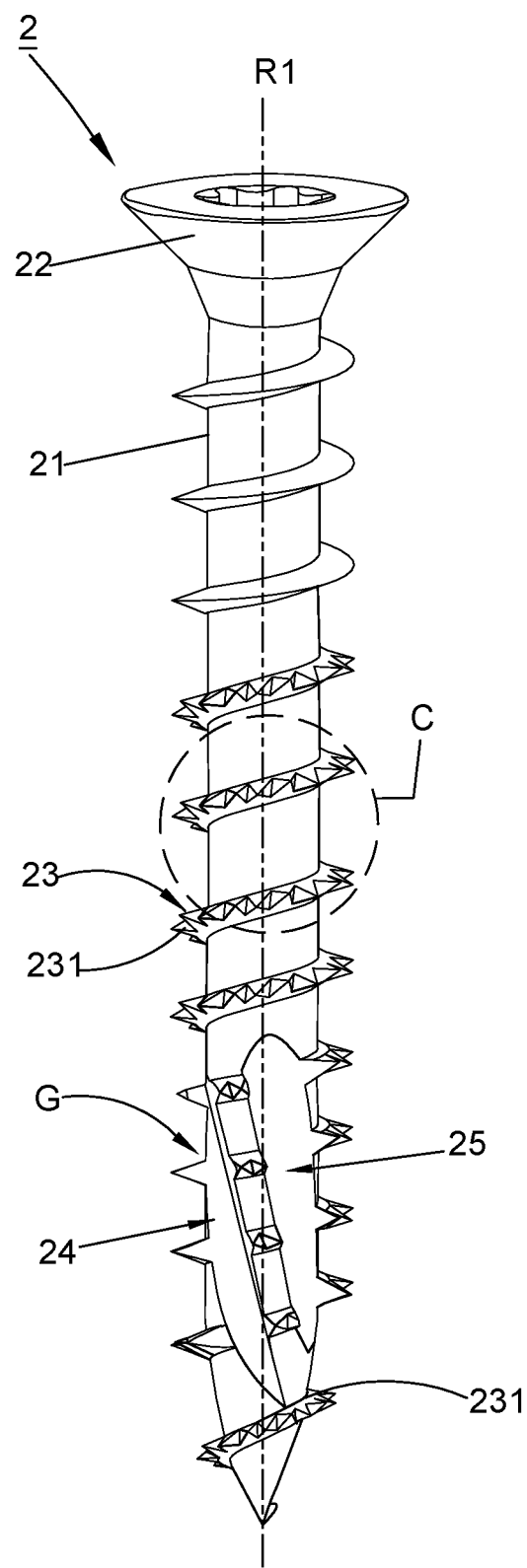
FIG. 20 is a schematic view showing a sixth preferred embodiment of this invention.
Figure 21:
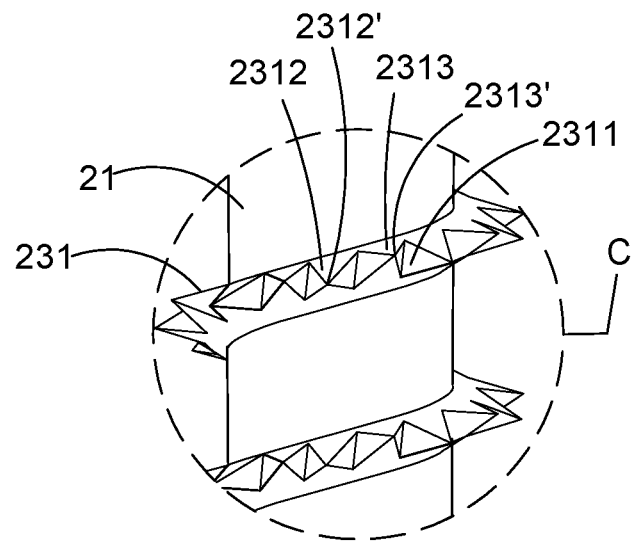
FIG. 21 is an enlarged view of the encircled portion C of FIG. 20.
Figure 22:
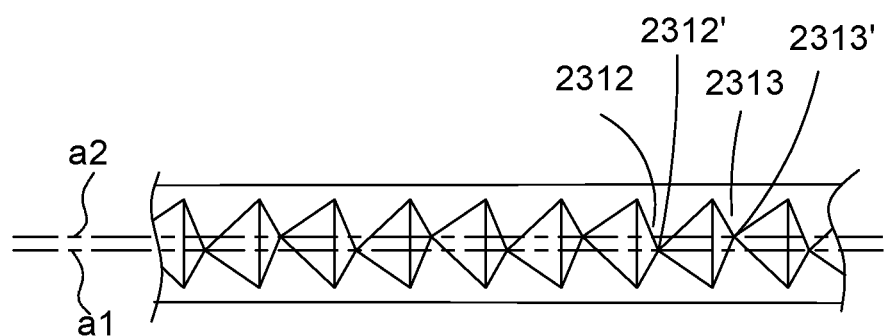
FIG. 22 is a front view of FIG. 21 viewed in plan.

FIGS. 20 and 21 show a sixth preferred embodiment of the screw 2 including the same elements as those described in the first preferred embodiment. Particularly, at least two thread convolutions 231 have the serrated configuration. In other words, each serrated thread convolution 231 is formed with a plurality of notches 2311 between which a plurality of first thread portions 2312 and a plurality of second thread portions 2313 alternating with the first thread portions 2312 are disposed. Each first thread portion 2312 has a first crest 2312'. Each second thread portion 2313 has a second crest 2313'. A first reference line a1 defined by connecting adjacent first crests 2312' in sequence is different from a second reference line a2 defined by connecting adjacent second crests 2313' in sequence. As shown in FIG. 22, the first reference line a1 is below the second reference line a2 so that the first thread portions 2312 slope downwards, and the second thread portions 2313 slope upwards for forming a serrated configuration with alternating upward and downward thread portions. This configuration adds cutting points to cut quickly and decrease screwing resistance and also engages with the workpiece firmly by the alternating thread portions to attain the anti-loosening effect.

To sum up, the screw of this invention mainly includes a shank on which a cutting slot unit is formed and includes a first cutting slot and a second cutting slot parallel to the first cutting slot. The extension of the first edge of the first cutting slot is opposite to the right-hand direction of the threaded portion spiraling around the shank, so the first cutting slot and the second cutting slot are defined as opposite slots to provide an increasing cutting ability, attain quick removal of chips, and help press the chips downwards to enhance the fastening effect.

While the embodiments are shown and described above, it is understood that further variations and modifications may be made without departing from the scope of this invention.

What is claimed is:

1. A screw with cutting slots comprising a shank with an outer periphery, a head connected to one end of said shank, and a threaded portion spirally disposed around said shank, wherein said shank tapers to terminate at a tip opposite to said head and defines an axis passing through said tip, said shank including a lower region and a main region defined between said lower region and said head, said tip being located within said lower region, said threaded portion including a plurality of thread convolutions spirally disposed in a right-hand direction and spaced from each other to define a pitch between every two adjacent thread convolutions of said plurality of thread convolutions, wherein said outer periphery defines a first peripheral envelope surface and a second peripheral envelope surface opposite to said first peripheral envelope surface, a cutting slot unit being formed on said shank and arranged on said first peripheral envelope surface, said cutting slot unit including a first cutting slot and a second cutting slot spaced from said first cutting slot, said first cutting slot having a first top pointing said head, a first bottom pointing said tip, at least one first wall extending between said first top and said first bottom, and two first edges formed at a place where said at least one first wall meets said outer periphery and said plurality of thread convolutions, said first edge extending towards said head in an extension direction, said extension direction being opposite to said right-hand direction of said plurality of thread convolutions, said second cutting slot having a second top pointing said head, a second bottom pointing said tip, at least one second wall extending between said second top and said second bottom, and two second edges formed at a place where said at least one second wall meets said outer periphery and said plurality of thread convolutions, one of said two first edges being parallel to one of said two second edges, and wherein a first distance defined between said two first edges is set from 0.5 to 1 times said pitch, and a second distance defined between said two second edges is set from 0.5 to 1 times said pitch.

2. The screw according to claim 1, wherein said cutting slot unit is situated within said lower region, a first space being defined between said first bottom and said tip, said threaded portion being spirally disposed from said tip toward said head, at least one complete thread convolution of said plurality of thread convolutions spiraling between said first bottom and said tip, said first bottom and said first top being respectively situated on a right side and a left side of said axis so that said extension direction goes across said axis from right to left.

3. The screw according to claim 1, wherein said cutting slot unit is situated within said lower region, said first bottom being connected to said tip.

4. The screw according to claim 1, wherein said threaded portion spirally disposed around said shank extends axially by an overall length, said at least one first wall extending by a first axial length, said first axial length being ⅓ times said overall length, said at least one second wall extending by a second axial length, said second axial length being ⅓ times said overall length.

5. The screw according to claim 1, wherein a third space defined between said first bottom and said second bottom is set from 0.5 to 2 times said pitch.

6. The screw according to claim 1, wherein at least two thread convolutions of said plurality of thread convolutions are formed with a plurality of notches, a plurality of first thread portions on which first crests are provided being formed between said plurality of notches, a plurality of second thread portions on which second crests are provided being formed between said plurality of notches and alternating with said plurality of first thread portions, a first reference line defined by connecting said first crests being different from a second reference line defined by connecting said second crests.

7. The screw according to claim 1, wherein two cutting slot units are situated within said lower region, said two cutting slot units being arranged on said first peripheral envelope surface and said second peripheral envelope surface respectively.

8. The screw according to claim 1, wherein said cutting slot unit includes at least one auxiliary cutting slot spaced from said second cutting slot, said at least one auxiliary cutting slot having an auxiliary top pointing said head, an auxiliary bottom pointing said tip, at least one auxiliary wall extending between said auxiliary top and said auxiliary bottom, and two auxiliary edges formed at a place where said at least one auxiliary wall meets said outer periphery and said plurality of thread convolutions, one of said two auxiliary edges being parallel to one of said two second edges, a fourth space defined between said second bottom and said auxiliary bottom being set from 0.5 to 2 times said pitch.

9. The screw according to claim 1, wherein at least two cutting slot units are formed and are respectively situated within said lower region and said main region, any of said at least two cutting slot units which is situated within said lower region being at least arranged on said first peripheral envelope surface.

10. The screw according to claim 1, wherein a second space defined between said first cutting slot and said second cutting slot is set from ⅙ to ⁴⁄₆ times said pitch.

* * * * *